United States Patent
Naratil

(10) Patent No.: US 7,672,893 B1
(45) Date of Patent: Mar. 2, 2010

(54) SYSTEM AND METHOD FOR TRADING TAXABLE AND NON-TAXABLE SECURITIES

(75) Inventor: Thomas C. Naratil, Warren, NJ (US)

(73) Assignee: UBS Financial Services, Inc., Weehawken, NJ (US)

( * ) Notice: Subject to any disclaimer, the term of this patent is extended or adjusted under 35 U.S.C. 154(b) by 1258 days.

(21) Appl. No.: 09/688,392

(22) Filed: Oct. 16, 2000

(51) Int. Cl.
G06Q 40/00 (2006.01)

(52) U.S. Cl. .................. 705/37; 705/35; 705/36 R

(58) Field of Classification Search .............. 705/35, 705/36, 37, 36 R
See application file for complete search history.

(56) References Cited

U.S. PATENT DOCUMENTS

| | | | |
|---|---|---|---|
| 4,412,287 A | 10/1983 | Braddock, III | 364/408 |
| 4,674,044 A | 6/1987 | Kalmus et al. | 364/408 |
| 4,694,397 A | 9/1987 | Grant et al. | 364/408 |
| 4,752,877 A | 6/1988 | Roberts et al. | 364/408 |
| 4,823,265 A | 4/1989 | Nelson | 364/408 |
| 4,933,842 A | 6/1990 | Durbin et al. | 364/408 |
| 4,942,616 A | 7/1990 | Linstroth et al. | 381/51 |
| 5,006,998 A | 4/1991 | Yasunobu et al. | 364/513 |
| 5,077,665 A | 12/1991 | Silverman et al. | 364/408 |
| 5,136,501 A | 8/1992 | Silverman et al. | 364/408 |
| 5,231,571 A | 7/1993 | D'Agostino | 364/408 |
| 5,297,032 A | 3/1994 | Trojan et al. | 364/408 |
| 5,375,055 A | 12/1994 | Togher et al. | 364/408 |
| 5,394,324 A | 2/1995 | Clearwater | 364/402 |
| 5,517,406 A | 5/1996 | Harris et al. | 364/408 |
| 5,557,517 A | 9/1996 | Daughterty, III | 364/408 |
| 5,715,402 A | 2/1998 | Popolo | 395/237 |
| 5,724,524 A | 3/1998 | Hunt et al. | 395/237 |
| 5,727,165 A | 3/1998 | Ordish et al. | 395/237 |
| 5,758,328 A | 5/1998 | Giovannoli | 705/26 |
| 5,794,219 A | 8/1998 | Brown | 705/37 |
| 5,802,497 A | 9/1998 | Manasse | 705/27 |
| 5,802,502 A | 9/1998 | Gell et al. | 705/37 |
| 5,826,244 A | 10/1998 | Huberman | 705/37 |
| 5,832,462 A | 11/1998 | Midorikawa et al. | 705/35 |
| 5,842,178 A | 11/1998 | Giovannoli | 705/26 |
| 5,870,719 A | 2/1999 | Maritzen et al. | 705/26 |
| 5,884,274 A | 3/1999 | Walker et al. | 705/4 |
| 5,884,286 A | 3/1999 | Daughtery, III | 705/36 |
| 5,890,140 A | 3/1999 | Clark et al. | 705/35 |
| 5,893,079 A | 4/1999 | Cwenar | 705/36 |
| 6,647,300 B1 * | 11/2003 | Balasubramanian et al. | 700/4 |
| 6,850,907 B2 * | 2/2005 | Lutnick et al. | 705/37 |

(Continued)

OTHER PUBLICATIONS

US Patent Publication No. US 2002/0052827, Waelbroeck et al, May 2, 2002.*

(Continued)

*Primary Examiner*—Lalita M Hamilton
(74) *Attorney, Agent, or Firm*—Proskauer Rose LLP

(57) ABSTRACT

A system for trading Certificates of Deposits, Discount Notes, CMOs, Corporate Bonds, High Yield Bonds, Illiquid Agency Securities, Mortgage Pass-Through Securities, Secondary Zero comprises an updatable offering inventory module and a price discovery module. The system allows users to send Request for Quotes (RFQs) to pre-determined dealers and capture dealer responses thereto. Traders who send RFQs have the ability to accept the best dealer response and execute a trade as an agent or to improve the best dealer response and execute the trade as a principal.

13 Claims, 4 Drawing Sheets

U.S. PATENT DOCUMENTS

2001/0039529 A1* 11/2001 Hoffman ............ 705/37
2002/0016759 A1*  2/2002 Macready et al. ...... 705/37
2002/0082967 A1*  6/2002 Kaminsky et al. ...... 705/37

OTHER PUBLICATIONS

Call to allow bond mart to move freely Mary Zachariah. Business Times. Kuala Lumpur: Sep. 12, 2000. p. 22.*

Stock market shakeout: A wave of stock market mergers heralds a new era of competition, says Paul Mahoney. But consumers, not regulators, should decide the winners; [National Edition 1] Paul Mahoney. National Post. Don Mills, Ont.: Jul 20, 2000. p. C.15.*

A. Levitt, *The Importance of Transparency in America's Debt Market*, Speech at The Media Studies Center, NY, NY (Sep. 9, 1998).

* cited by examiner

SYSTEM AND METHOD FOR TRADING TAXABLE AND NON-TAXABLE SECURITIES

BACKGROUND OF THE INVENTION

1. Field of the Invention

The present invention relates to a system and method for trading taxable and non-taxable securities and/or financial instruments; and more particularly to a computer-implemented system for automatically executing market orders for Certificates of Deposits, Discount Notes, CMOs, Corporate Bonds, High Yield Bonds, Illiquid Agency Securities, Mortgage Pass-Through Securities, Secondary Zero Instruments, and Municipal Securities.

2. Description of the Prior Art

New client demands, technological innovations and tighter regulatory controls are changing the shape of the money management industry. A new trend in asset management now provides clients with systems that allow execution of trades without concomitant fees. The evolution of the Internet and the development of new technological capabilities are pressing security houses to develop methods that facilitate the need for electronic trading. In traditional asset management, customers may be advised by financial advisors/investment executives who work with traders to execute securities trades on behalf of the customers. When a customer desire to trade securities, the ability of a trader to communicate efficiently with dealers can be the difference between profitability and un-profitability for the customer. Therefore, the need for highly efficient electronic trading is extremely valuable.

With the growth of electronic trading, however, comes concerns about the lack of price transparency and liquidity of securities. Accordingly, the SEC and other regulatory bodies have called on the National Association of Securities Dealers (NASD) to: (1) adopt rules requiring dealers to report transactions to the NASD and to develop systems to receive and redistribute transactions prices on an immediate basis; and (2) create a system for transactions to enable regulators to take a proactive role in supervising the corporate debt market rather than only reacting to complaints brought by investors. Levitt, Arthur, Chairman of the United States Securities and Exchange Commission, Sep. 9, 1998, *The Importance of Transparency in America=s Debt Market*, Speech at the Media Studies Center, New York, N.Y. As stated by Chairman Levitt, A[t]ransparency, disclosure and accountability . . . are the essential ingredients to confidence. And without [confidence] . . . markets can neither sustain long term growth not adapt to a rapidly changing environment. Ibid.

The prior art has recognized the need to adopt computerized trading systems. U.S. Pat. No. 4,942,616 to Linstroth et al. discloses an apparatus and method for use by a broker that includes a memory for holding a number of market prices, each corresponding to a security or a commodity. A speech synthesizer provides price quotes to customers over the telephone. The apparatus is also capable of reporting price trigger violations to a pre-determined telephone number.

U.S. Pat. No. 5,758,328 to Giovannoli teaches a computerized system and method for forming a computer-based communications network, which includes network buyers or network vendors. The system allows for the processing of requests for quotations for goods and services through at least one central processing unit.

U.S. Pat. No. 4,674,044 to Kalmus et al. teaches a data processing apparatus that creates an automated trading market for one or more securities. This reference discloses a system that includes means for retrieving the best obtaining bid and asking prices from a remote database.

None of these or other references, however, teach a system or method that includes a price discovery module for sending Requests for Quotes (RFQ) to pre-determined dealers and for receiving/capturing dealer responses to the RFQs. Moreover, the prior art fails to show a system having means for participants to access historical data for price and trade information. In addition, there is needed a system or method that allows a user who sent the RFQ to either accept the best response and execute the trade as an agent or improve the best response and execute the trade as a principal.

SUMMARY OF THE INVENTION

In accordance with the present invention, there are provided tools for pricing and trading fixed income instruments that allows users to provide system participants with optimal buy and sell prices. The present invention also provides a system and method whereby historical data can be accessed by users of the system. In addition, the present invention allows for a sender of an RFQ to either accept the best dealer response and execute a trade as an agent or improve the best response and execute the trade as a principal.

According to a first aspect of the present invention, a computer-implemented system for trading taxable and non-taxable securities comprises (1) an updatable offering inventory module for tracking, receiving and displaying securities offerings and information; and (2) a price discovery module for forwarding requests for quotations (RFQ's) to at least one dealer, capturing the dealer responses and transmitting the dealer responses for display to the offering inventory module, and executing a trade based upon a best RFQ response.

A second aspect of the present invention provides a computer-implemented system for trading taxable and non-taxable securities comprising (1) a computerized workstation for communicating trade information; (2) an updatable offering inventory module for tracking, receiving and displaying securities offerings and information; (3) a price discovery module for sending a request to pre-determined dealers and receiving responses thereto, wherein responses received are communicated for display in the offering inventory module; and (4) an internal module for internal users to access the offering inventory module and price discovery module.

A third aspect of the invention provides a computer-implemented method for trading taxable and non-taxable securities comprising (1) storing information pertaining to the securities available for trading in an updatable offering inventory module; (2) sending a request from a price discovery module to pre-determined dealers; (3) capturing dealer responses to the request in the price discovery module; (4) transmitting the dealer responses for display in the offering inventory module; and (5) implementing a trade based on the dealer responses.

A fourth aspect of the present invention provides a program product, stored on a recordable media, for facilitating the trading of securities. The program product comprises (1) offering inventory means for tracking securities offerings and for receiving and displaying securities information; (2) price discovery means for executing a trade at a best response, wherein requests are sent from the price discovery means to dealers, and wherein dealer responses to the requests are received in the price discovery means and communicated for display in the offering inventory means; and (3) operations means for providing users access to the offering inventory means and the price discovery means.

BRIEF DESCRIPTION OF THE DRAWINGS

The invention will be more fully understood and further advantages will become apparent when reference is made to the following detailed description of the preferred embodiments of the invention and the accompanying drawings in which.

DETAILED DESCRIPTION OF THE PREFERRED EMBODIMENTS

Figure 1:
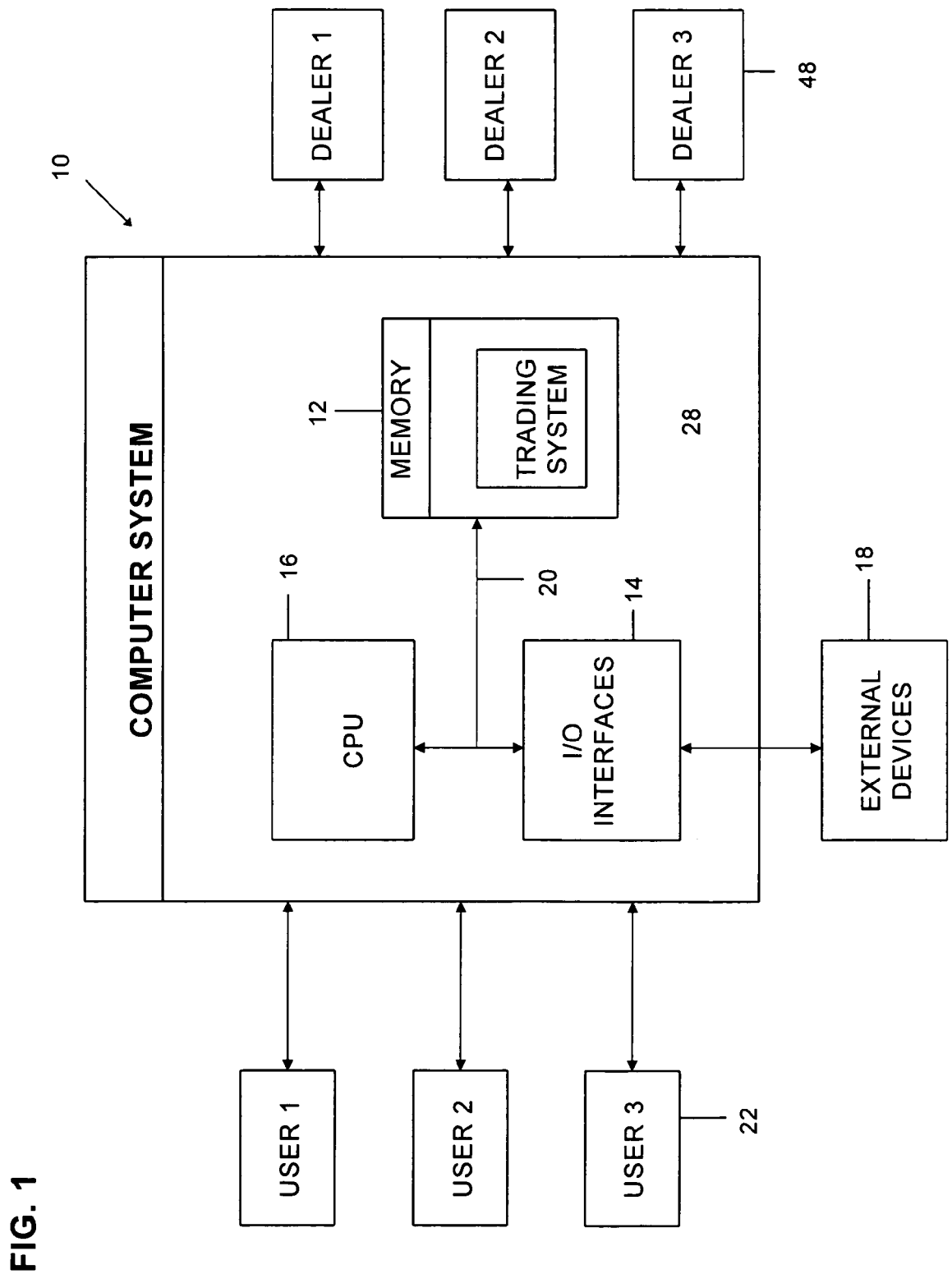
FIG. 1 depicts a block diagram of a computer system having an automated trading system.

The present invention provides an automated system for trading taxable and non-taxable financial instruments and/or securities such as Certificates of Deposits, Discount Notes, CMOs, Corporate Bonds, High Yield Bonds, Illiquid Agency Securities, Mortgage Pass-Through Securities, Secondary Zero Instruments, and Municipal Securities. The system allows users to obtain current securities offerings and information related thereto, request quotations from selected dealers, and execute a trade based on the dealer response to the request.

Generally stated, the present invention provides a computer implemented system for trading taxable and non-taxable securities comprising an updatable offering inventory module for tracking, receiving and displaying securities offerings; and a price discovery module, for forwarding RFQs to at least one dealer, capturing the dealer responses and transmitting the dealer responses for display in the offering inventory module wherein the system executes a trade based upon a best RFQ.

Users are generally connected to the system by conventional computerized workstations. Such workstations enable user interaction with the various modules of the system. For example, users can obtain information regarding the availability, price and quantity of securities for trade execution.

The offering inventory module provides information pertaining to all securities available for trading by the system including real time price information as provided by a market data feed from conventional sources such as Reuters. If a user desires to obtain securities not contained in the offering inventory module or to sell a particular instrument, the user can send an RFQ, via the price discovery module, to selected or pre-determined dealers. The dealer responses are captured by the price discovery module and transmitted to the offering inventory module where they are displayed. As will be discussed in greater detail below, the type of user (e.g., trader, investment executive, individual customer) dictates the type and quantity of information the user is able to access, as well as their capability to modify the securities offerings or information contained in system.

A system proprietor automatically updates price and quantity information within the system to reflect trade executions, cancellations, modifications or other changes in financial information such as price and quantity. In addition, the system allow traders to manually enter trade orders and update the offering inventory module. Preferably, the system is used by financial advisors on behalf of customers, traders, and individual customers seeking to trade securities. Advantageously, the system is configured to allow a customer and/or trader to trade within a particular brokerage house (e.g., internally) as well as outside of a particular institution (e.g. externally).

The system of the present invention may utilize a combination of mid-range to advanced multiprocessor-based servers, such as Ultra II from Sun Microsystems, utilizing standard operating systems, application software written in C++, Java or a similar language, and Input/Output controllers for connection of the various system components.

The servers may be connected via wide area networks (WAN), local area networks (LAN) or other private networks. The computerized workstations may be connected to the servers by any of the forgoing means as well as by the Internet. The workstations and servers may utilize conventional token ring connectivity for WAN, LAN, or other private networks, or Ethernet, or other conventional communications standards. Where the workstations are connected to the system server via the Internet, connectivity is provided by conventional TCP/IP sockets-based protocol. In this instance, the workstations would utilize an Internet service provider outside the system to establish connectivity to the system server within the system.

With the foregoing in mind, reference is made to FIG. 1 in which is shown a computer system 10 comprising memory 12, input/output interfaces 14, a central processing unit (CPU) 16, external devices/resources 18, and bus 20. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or it may be distributed across one or more processing units in one or more locations, e.g., on a client and server. I/O interfaces 14 may comprise any system for exchanging information from an external source. External devices 18 may comprise any known type of external device, including a CRT, LED screen, hand held device, keyboard, mouse, voice recognition system, speech output system, printer, facsimile, pager, and the like. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

It is understood that the present invention can be realized in hardware, software, or a combination of hardware and software. As indicated above, the computer system 10 according to the present invention can be realized in a centralized fashion in a single computerized workstation, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when loaded and executed, controls the computer system 10 such that it carries out the methods described herein. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Stored in memory 12 is trading system 28. Also shown in FIG. 1 are users 22, which may include traders, investment executives/financial advisors as well as individuals who access the trading system 28 to trade and/or obtain information regarding taxable and non-taxable securities such as Certificates of Deposits, Discount Notes, CMOs, Corporate Bonds, High Yield Bonds, Illiquid Agency Securities, Mortgage Pass-Through Securities, Secondary Zero Instruments, and Municipal Securities. Trading system 28, which is described in further detail below, comprises one or more software programs that provide a system for users to access financial security information, to send Request for Quotes (RFQs) to selected dealers 48 and to capture the dealers=48 responses to the RFQs.

Figure 2:
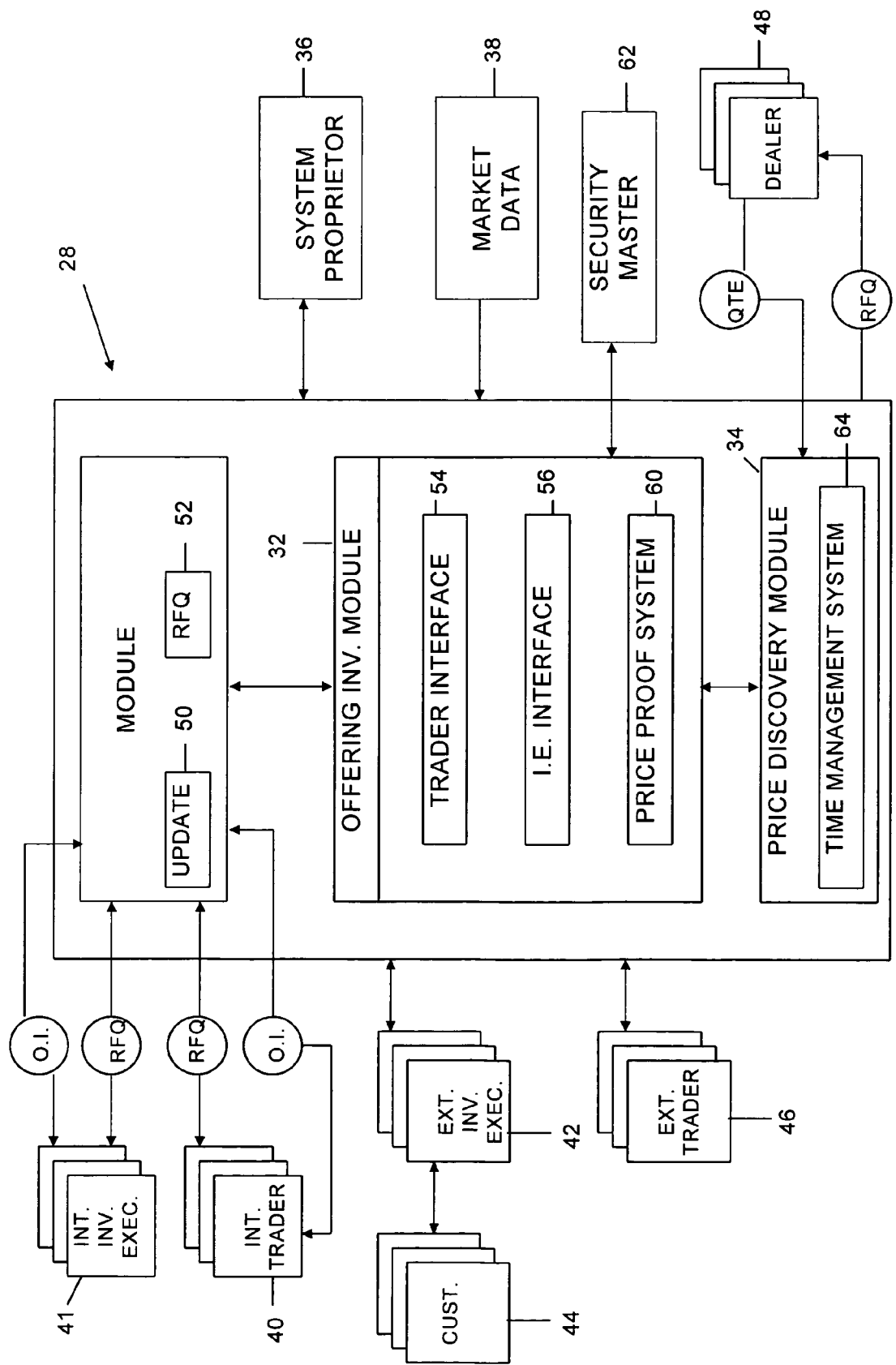
FIG. 2 depicts a block diagram illustrating the relationship between the components of the automated trading system.

Referring now to FIG. 2, trading system 28 is shown. In particular, trading system 28 includes module 30, offering inventory module 32, price discovery module 34, security master 62, system proprietor 36 and market data feed 38. Various users 40-42 and 46 can access the trading system 28 and view information pertaining to securities listed in offering inventory module 32. Users 40-42 and 46 who desire to make trades can send RFQs to predetermined dealers 48 from the offering inventory module 32 via the price discovery module 34. The dealer responses are captured by the price discovery module 34 and transmitted for display in the offering inventory module 32. Users can be internal or external to the system. Exemplary internal users include investment executives 41, traders 40 or customers (not shown) who access the trading system 28 through the module 30. Investment executives 42 are external users who generally act on behalf of customers 44. Lastly, external or streetside traders 46 can manually access and update the system to accommodate streetside trades. The external users do not require access to the system through module 30. These users can instead directly access the offering inventory and price discovery modules. It should be understood, however, that other users can exist and the user types recited herein are not intended to be exhaustive. Moreover, it should be appreciated that customers 44 can access certain aspects of the trading system 28 directly.

The price discovery module 34 enables users to send RFQs, select the best price/response and execute a trade. By way of illustration, where trader 40, 46 sends the RFQ, the trader has the capability to accept the best dealer response and execute the trade as an agent or to improve the best response and execute the trade as a principal. It is not enough for a trader to match a best response. Instead, a trader must improve the best response in order to execute as a principal. In addition, all participants (i.e., internal traders 40, internal investment executives 41, external investment executives 42, external traders 46 and dealers 48) have the capability to access the system and view historical data for price and trade information.

Included within the price discovery module 34 is time management system 64, which allows the system to assign firm deadlines for responding to RFQs and for accepting a response to an RFQ. For example, the time management system 64 enforces three time limits: RFQ Exposure Time; Firm Quote Time; and Subject Quote Time. The RFQ Exposure Time is the time limit set for the dealers to respond to an RFQ. The Firm Quote Time is the time limit for a sender of an RFQ to accept or reject a dealer response, or enter into a negotiation. The Subject Quote Time is the time after the Firm Quote Time has elapsed in which a sender of an RFQ can inquire with a dealer as to whether the dealer=s response is still valid. The Firm Quote Time helps prevent the automatic loss of a response due to an expired time limit.

The handling and management of RFQs and responses are partially based upon the type of user sending the RFQ. In particular, a trader 40, 46 can generate an RFQ and send it directly to pre-determined dealers 48 (i.e., each dealer is selected in advance by the sender of the RFQ). An RFQ originating from an investment executive 41, 42 is either sent directly to dealers 48 or routed to a trader 40, 46 for prior review. For an RFQ entered by a trader or investment executive, the user enters the quantity and security information at the offering inventory module 32 using either the trader interface 54 or the investment executive interface 56. In addition to quantity and security information, the user enters a bid side RFQ for a bid (to sell securities) inquiry for all securities listed in the security master 62 as well as an offer side RFQ for a bid (to sell securities) inquiry for all securities listed in the security master 62 or the offering inventory module 32. The security master 62 specifies the increments of the minimum denomination for the quantity of security.

Trader 40, 46 also has the capability to enter a bid or offer for their own account. Furthermore, trader 40, 46 also can specify the breakdown or pieces for aggregate orders and trading system 28 provides an adjustment for average price. In addition, trader 40, 46 can designate the particular dealers 48 that will receive the RFQ as well as the capability to modify the RFQ Exposure Time, the Firm Quote Time and the Subject Time, up to a pre-determined minimum amount of time. Traders 46 also have the ability to review all pending RFQs. If a sell RFQ is made by an investment executive 41, 42 on behalf of customer 44, the system verifies that the customer 44 owns the position. If not, the system generates an alert indicator which would be sent to investment executive 42.

Trading system 28 tracks time limits using an internal clock device (not shown) and displays messages indicating RFQ status. In addition, trading system 28 validates the settlement date and notifies the trader if the date is non-standard. All orders are automatically processed for standard settlement, that is 1-3 business days after execution. Nevertheless, system 32 can accommodate skip day, corporate or other settlement dates using manual processing. Here, an order with a non-standard settlement date would be forwarded to a trader for review and manual execution. This allows a trader to apply price adjustments to account for financing considerations.

The trading system 28 also distinguishes between bids and offers. For bids, the system automatically sends the RFQ to the price discovery module 34. The RFQ can be flagged for trader review or automatically sent to the selected dealers 48. With respect to offers, trading system 28 determines if the security/financial instrument is in the offering inventory module 32. If so, a message is sent to the trader who posted the item. In addition, price proof system 60 generates an RFQ to the price discovery module 34 to obtain the best price for the listed item. In this way, the system may also accommodate offers for securities that are not listed in the offering inventory module.

Once an RFQ has been sent, it may be canceled by trader 40, 46 during the RFQ Exposure Time. Upon RFQ cancellation, trading system 28 sends notice to the corresponding dealers 48.

Trading system 28 can also accommodate market or day limit orders. Here, the user selects the market or limit. In addition, the user can specify breakdown prices for aggregated orders and the trading system 28 will allow price adjustment for average price.

In responding to an RFQ, dealers 48 need only provide a one-sided quotation. During the RFQ Exposure Time, a trader who sent an RFQ and dealers who responded thereto have the capability to view all responses. However, all responses are anonymous so that a particular dealer 48 cannot be identified. In addition, the trader who sent the RFQ has the last look at the best response in order to afford an opportunity for price improvement. Advantageously, the system parses the responses and allows users to view only the best response (i.e., most competitive bid/offer received).

The system allows users to accept or reject a response to an RFQ and execute a trade thereon. Where appropriate, the system allows the user to enter into price negotiation. That is to say, users may enter limit order to buy and sell specified quantities of securities. In the event of a tie, the first response is awarded the trade. Upon acceptance, trading system 28 retrieves the real time benchmark from the market data feed 38, calculates the executed yield and price, and forwards this to the user. In addition, the system displays delivery instructions to a user with the capability to override default instructions. This allows such users to enter special delivery instructions, pending approval from the system proprietor 36. Once a trade has been executed, a time is stamp applied, and customer and trader positions as well as the offering inventory 32 are updated. Importantly, trading system 28 determines the execution price/yield based on the spread and current benchmark level at the actual time of execution, not at the time of RFQ entry. The user and dealer whose response was accepted receives confirmation of executed trades. The confirmation includes trade details such as security description, executed price, yield, net settlement amount, delivery date, delivery instructions, and confirmation number. All trade details and RFQ responses representing competitive bids are stored as historical data, which as indicated above, can be accessed by all users and/or dealers. If the trade is external, the trading system 28 facilitates riskless principal transaction. That is, after receiving an order to purchase or sell, the system executes a contemporaneous transaction to offset the order. The system may ascribe taxes to trades when appropriate.

After a trade has been executed, a trader 40, 46 can also cancel the trade or modify any trade details. Investment executives 41, 42, however, may only modify certain non-price, non-settlement dependent trade details. Upon modification or cancellation, trading system 28 generates a confirmation for all parties. Trading system 28 also stores all transaction details and the spread and price/yield calculation at the time of trade execution. Certain segments of this historical information is available upon user query; for example, traders 40, 46 and investment executives 41, 42 can query any executed transaction. All other users may be permissioned access to specific database information. Traders 40, 46 also have the capability to send confidential messages to undisclosed dealers 48. Traders can also access spread history and view all information on their own transactions. However, for transactions by others, the traders will only view price, date and time information. The trader that wins a trade will see all responses, the high bid, the cover and the total number of bids. All others will see the high, low and average bids.

Trading system 28 stores all transaction details including spread history (day, time) and displays spread values, price/yield and benchmark levels for all taxable products. In addition, the spread and price/yield history are updated as transactions take place. Trading system 28 also attaches current spread data to a transaction record when a trade is executed and captures the current existing price (yield) of the desired benchmark at the time of the transaction. All transaction details are stored within trading system 28 for seven years but can be displayed for a period of six months. Trading system 28 also provides access to static data such as security, user, and dealer files, and provides conversion from price to yield. Moreover, the system 28 supports all reporting mechanisms for high yield and municipal securities; for example, high yield stocks are reported to NASDAQ via FIPS and municipal stocks are reported to the MSRB via NSCC.

The offering inventory module 32 lists all securities offerings and information made available to the users both internally and by participating firms. External investment executives 42 and external traders 46 directly access offering inventory module 32 in order to gain access to the trading system 28 and to send RFQs to the pre-determined dealers 48 through the price discovery module 34. In contrast, internal traders 40 and internal investment executives 41 use the internal module 30 to access the offering inventory module 32 and the price discovery module 34. As described above, internal investment executives 41 and internal traders 40 will have the same capabilities for accessing and updating 50 the securities offered and the security information in offering inventory module 32 as the external investment executives 42 and external traders 46, respectively. In addition, internal users 40, 41 can send RFQs 52 by accessing the trading system 32 through the internal module 30.

In accessing offering inventory module 32, investment executives 41, 42 only have the ability to view what is listed in the offering inventory module 32 while traders 40, 46 have the capability to both view and modify price and quantity information. Since traders 40, 46 have different capabilities than external or internal investment executives 40, 42, the offering inventory module 32 has separate interfaces 54, 56 for each user type. These separate interfaces allow users to access and interact with trading system 28 according to their pre-determined entitlements determined by system proprietor 36.

Each firm listing securities in the offering inventory module has the capability to specify whether a particular security is shown only to their own customers 44 or to all users. In addition, traders 40, 46 can offer two levels of pricing: a first level comprising the offering price for external users; and a second level comprising the offering price for internal users.

Investment executives 41, 42 and traders 40, 46 accessing the offering inventory module 32 can request a realtime display of updated offerings in the offering inventory module 32 and have the capability to enter market or limit orders based thereon. In addition, investment executives 41, 42 can submit market orders for price improvement based on the offering inventory module 32. All users 40-42 and 46 can also access the security master 62 to obtain details of securities.

As indicated above trading system 28 affords traders 40, 46 greater capabilities than investment executives 41, 42. In particular, traders 40, 46 can highlight securities that are believed to be the best buys for the investment executives 41, 42. In addition, traders 40, 46 can manually indicate an issue that should have the quantity automatically updated as a result of trade execution. Traders 40, 46 can also manually enter a better offering inventory price, which is updated in the offering inventory module 32 if it is better than the current price. Traders 40, 46 can also specify a benchmark, specify price based on size categories, and indicate the length of time that a price is Afirm.@ In addition, they can indicate that an issue is a trading desk priority. Advantageously, system 28 differentiates between internal 40, 41 and external users 42, 44 and 46 by providing different means of access.

In accordance with the invention, live prices have precedence over subject prices. By way of example, system 28 tracks prices for a certain length of time after which the price becomes subject and no longer eligible for automatic execution without approval from the user posting the price. When an order is entered from the offering inventory module 32, the system first determines whether the price/yield is subject or firm. If firm, a trade is executed and confirmation sent. However, if subject, the order is transmitted to the price discovery module 34 for RFQ by price proof system 60. In addition, an order is sent to the traders listing the offering. Since the system always displays the best price, the participant posting the price will receive the order. The trader then has the option to fill the order at the limit price, counter the price with a new level, or indicate that he or she is not longer a seller of that issue.

The trading system 28 links each offering to the posting user; however, traders 40, 46 can only update their own respective offerings. The system 28 automatically updates to reflect automatic and manual transactions. In particular, a trader's securities and quantities position is automatically updated provided there is sufficient quantity available for trading and the trader=s position is long. The price/yield is also automatically updated based on the spread that is entered by the trader 40, 46. The price update is based on the market feed 38 and the spread entered by the trader 40, 46 posting the offering. The price shown is equal to the price calculated at the time the inventory is displayed. Advantageously, the system 28 accommodates price differentials for different size offerings. By way of example, lots of 1-25 could be offered at +25 basis points (bps), lots of 26-50 could be offered at +27 bps, and lots of 51-100 could be offered at +30 bps. As readily understood, basis points are equivalent to one one-hundredth of one percent of yield, and are the smallest measure used in quoting yields on bonds and notes. for example, an addition of 40 basis points to a yield of 7.50% increases the yield to 7.90%. basis points are normally used when quoting yields on bonds or notes. As indicated above, all price updates to the offering inventory module 32 are real time from the market data feed 38. In addition, when an order is entered from the offering inventory module 32, trading system 28 prompts the user for approval prior to executing.

The system also provides a sales credit for prices based upon certain criteria established by participating broker dealers. Conversely, fee based, non-commission accounts do not include a sales credit. Where these criteria are attained, trading system 28 calculates the net price (based on the best available price) without the sales credit. Investment executives 41, 42 accessing the offering inventory module 32 will view the base price without the sales credit as well as base price sales credit, net price and yield after sales credit. In contrast, the system captures the best available price plus any applicable sales credit to derive net price for other users.

In accordance with the present invention, real time risk management features are provided. For example, the system can track securities bought and sold in different maturity sectors as determined by trader input. This includes the calculation of duration and 10 year equivalent for each maturity sector (including accrued interest) based on trader input security and value.

Figure 3:
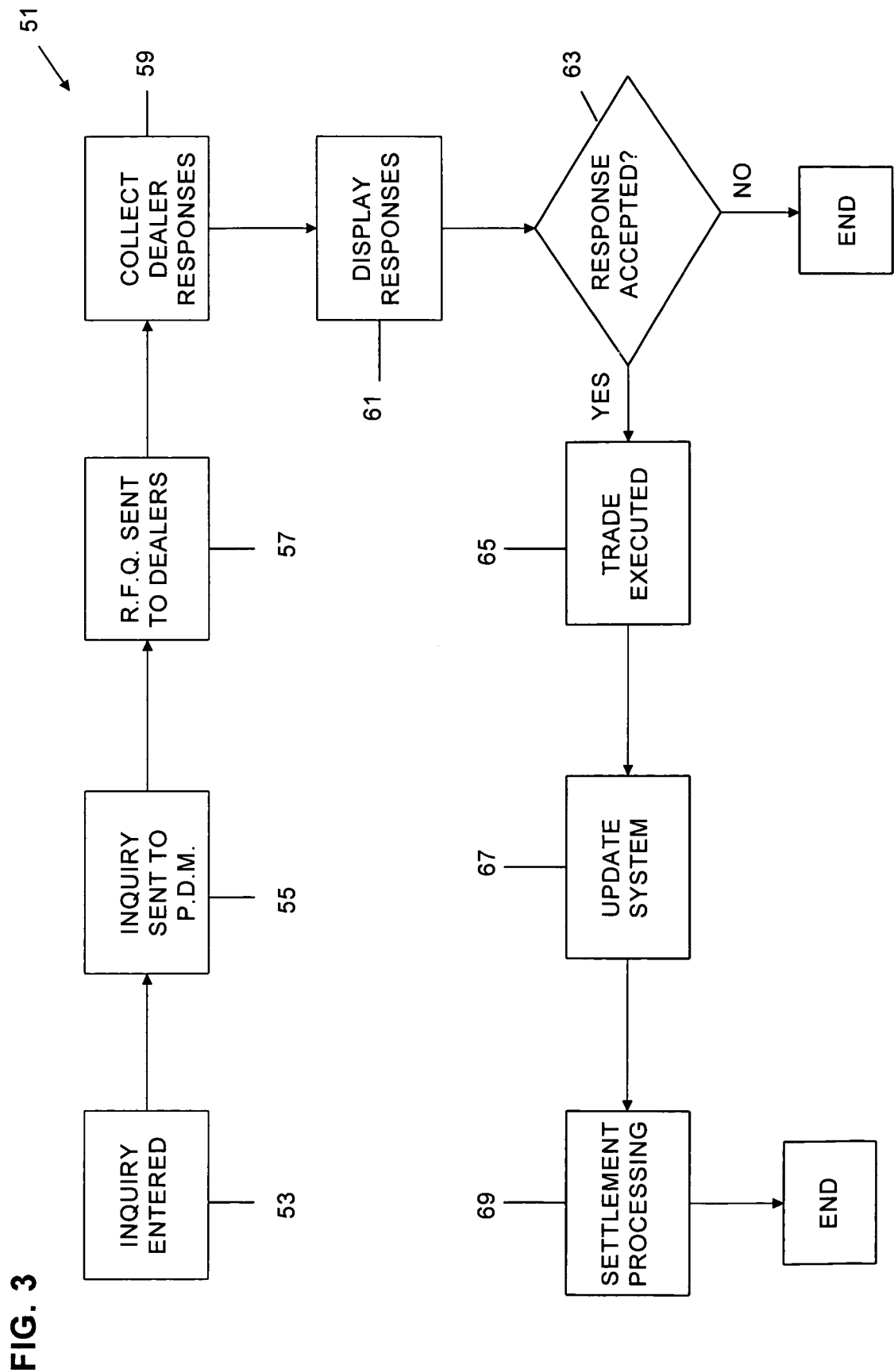
FIG. 3 depicts a first process flow diagram illustrating system logic for processing a market order, in accordance with the present invention.

FIG. 3 illustrates a first process flow diagram 51 in which an RFQ is sent from price discovery module 34. In particular, an inquiry is entered 53 in the offering inventory module and sent to the price discovery module 55. The system forwards RFQ to pre-determined dealers 57, and dealer responses are collected in the price discovery module 59, and displayed in the offering inventory module 61. The RFQ sender then has the choice whether to accept or reject the dealer response 63. If the response is accepted, the trade is executed 65, the system is updated 67 and the settlement is processed 69. Where the response is rejected, the process is terminated.

Figure 4:
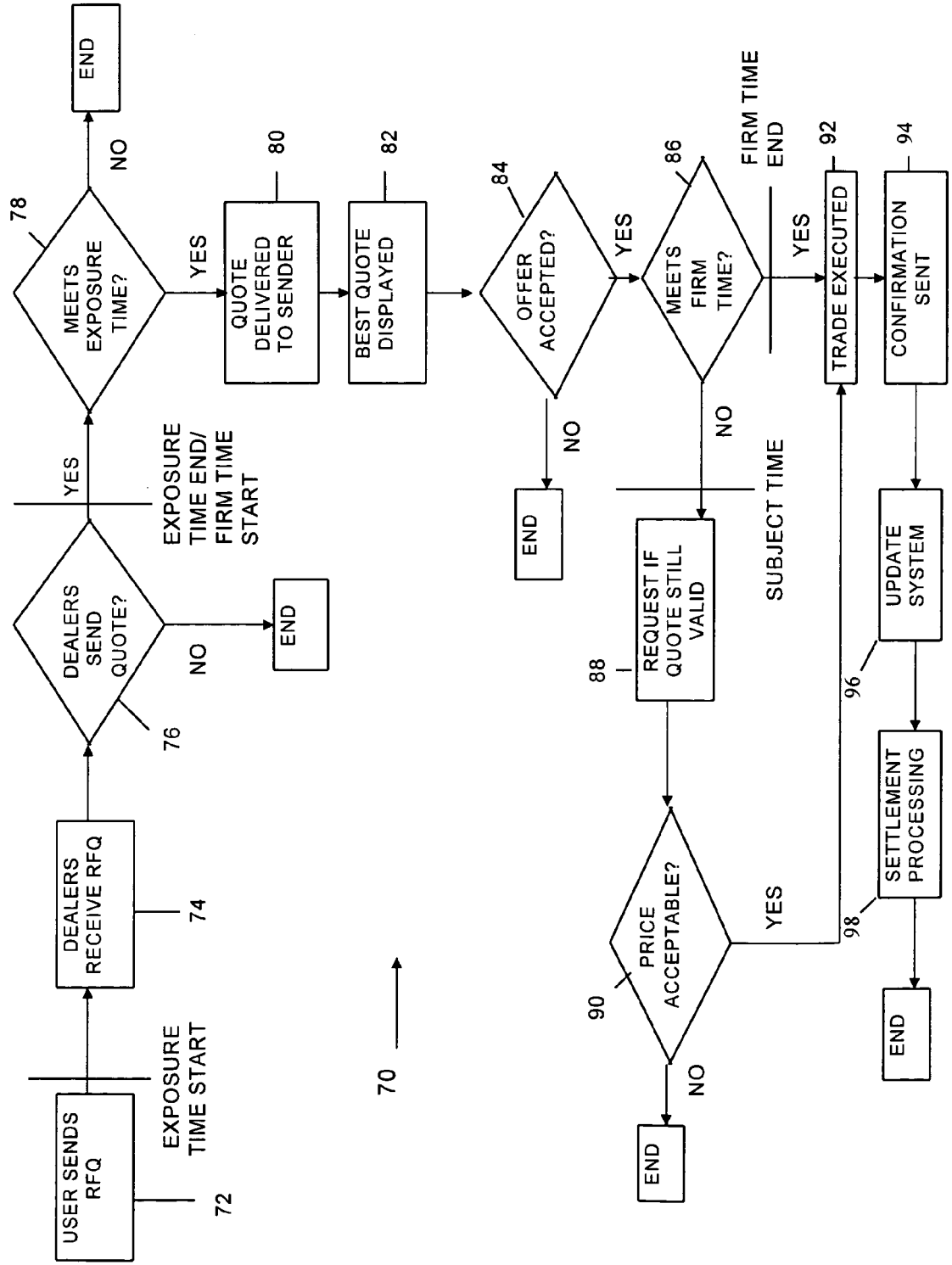
FIG. 4 depicts a second process flow diagram illustrating system logic for processing a market order, in accordance with the present invention.

FIG. 4 illustrates a second process flow diagram 70 detailing the RFQ process having time limits established by time management system 64. First, a user sends an RFQ 72, thereby starting the RFQ Exposure Time. The selected dealers which receive the RFQ 74 respond 76 by sending a quote. Assuming the response was sent within the RFQ Exposure Time limit, the quotes are delivered 80, but only the best quote is displayed 82. If the user accepts the offer 84, the system determines whether the acceptance occurred prior to expiration of the Firm Quote Time limit. If so, the trade is executed. If not, the user requests whether the quote is still valid 88. The time which the sender has to inquire whether a quote is still valid is known as the Subject Time. If the inquiry was made within the Subject Time and the dealer indicates the price is still valid 90, the trade is executed 92. Once the trade is executed, confirmation is sent to the users 94, the system is updated 96 and settlement processing initiated 98.

Having thus described the invention in rather full detail, it will be understood that such detail need not be strictly adhered to but that various changes, modifications may suggest themselves to one skilled in the art, all falling within the scope of the present invention as defined by the subjoined claims.

The invention claimed is:

1. A computer-implemented system for trading taxable and non-taxable securities or financial instruments comprising:
    a computer workstation that executes computer code stored on the computer workstation, the computer code comprising
    an offering inventory code module for causing the workstation to
        display offerings of the taxable and non-taxable securities or financial instruments and responses to requests for quotations (RFQs) on the workstation and
        update the offerings and the responses to RFQs displayed on the workstation; and
    a price discovery code module for enabling the workstation to
        send RFQs to at least one predetermined dealer,
        receive at least one dealer response to the RFQs, and
        execute a trade as an agent based on a best RFQ response or as a principal by improving the best RFQ response.

2. The computer-implemented system for trading taxable and non-taxable securities or financial instruments as recited by claim 1, the computer code further comprising a system proprietor code module that causes the workstation to allow only selected users to view all of the RFQ responses in the offering inventory module displayed on the workstation.

3. The computer-implemented system for trading taxable and non-taxable securities or financial instruments as recited by claim 2, wherein the system proprietor code module causes non-selected users to view only the best RFQ response in the offering inventory module displayed on the workstation.

4. The computer-implemented system for trading taxable and non-taxable securities or financial instruments as recited by claim 1, wherein the price discovery module includes a time management system.

5. The computer-implemented system for trading taxable and non-taxable securities or financial instruments as recited by claim 4, wherein the time management system causes the workstation to impose:
    a first time limit that determines an amount of time for sending the responses to the RFQs;

a second limit that determines an amount of time for acceptance of the responses to the RFQs; and a third time limit, after the second time limit has passed, for the sender to inquire whether the responses to the RFQs are still valid.

6. A method for trading taxable and non-taxable securities or financial instruments with a computer workstation that executes software stored on the workstation to perform steps comprising:

displaying information pertaining to the taxable or nontaxable securities or financial instruments available for trading including responses to requests for quotation (RFQs);

sending RFQs to at least one pre-determined dealer;

receiving at least one dealer response to the RFQs; and executing a trade as an agent based on a best RFQ response or as a principal by improving the best RFQ response; and updating the information pertaining to the securities or financial instruments available for trading including the dealer responses to the RFQs.

7. The method for trading taxable and non-taxable securities or financial instruments as recited by claim 6, wherein the displaying step further comprises providing access to all of the RFQ responses only to selected users.

8. The method for trading taxable and non-taxable securities or financial instruments as recited by claim 6, wherein the displaying step further comprises providing non-selected users access to the best RFQ response but not to all of the RFQ responses.

9. The method for trading taxable and non-taxable securities or financial instruments as recited by claim 6, further comprising setting a first time limit that determines an amount of time for sending the responses to the RFQs;

setting a second limit that determines an amount of time for acceptance of the responses to the RFQs; and setting a third time limit that determines an amount of time, after the second time limit has passed, to inquire whether the responses to the RFQs are still valid.

10. A computer readable tangible medium having code stored thereon that is executed on a computer workstation for performing a method for trading taxable and non-taxable securities and financial instruments comprising the steps of:

displaying on the computer workstation information pertaining to the taxable and non-taxable securities or financial instruments available for trading including responses to requests for a quotations (RFQs);

sending RFQs to at least one pre-determined dealer;

receiving at least one dealer response to the RFQs; and executing a trade as an agent based on a best RFQ response or as a principal by improving the best RFQ response; and updating the information pertaining to the taxable and non-taxable securities or financial instruments available for trading including the dealer responses to the RFQs.

11. The computer readable tangible medium having code stored thereon for that is executed on a computer workstation for performing a method for trading taxable and non-taxable securities or financial instruments as recited in claim 10, wherein the displaying step of the method further comprises providing access to all of the RFQ responses only to selected users.

12. The computer readable tangible medium having code stored thereon that is executed on a computer workstation for performing a method for trading taxable and non-taxable securities or financial instruments as recited in claim 10, wherein the displaying step further comprises providing non-selected users access to the best RFQ response but not to all of the RFQ responses.

13. The computer readable tangible medium having code stored thereon that is executed on a computer workstation for performing a method for trading taxable and non-taxable securities or financial instruments as recited in claim 10, wherein the method further comprises:

setting a first time limit that determines an amount of time for sending the responses to the RFQs;

setting a second limit that determines an amount of time for acceptance of the responses to the RFQs; and setting a third time limit that determines an amount of time, after the second time limit has passed, to inquire whether the responses to the RFQs are still valid.

* * * * *

UNITED STATES PATENT AND TRADEMARK OFFICE
CERTIFICATE OF CORRECTION

PATENT NO. : 7,672,893 B1 Page 1 of 1
APPLICATION NO. : 09/688392
DATED : March 2, 2010
INVENTOR(S) : Thomas C. Naratil It is certified that error appears in the above-identified patent and that said Letters Patent is hereby corrected as shown below:

Col. 12, line 16: delete the word "for"

Signed and Sealed this

Twenty-fourth Day of August, 2010

David J. Kappos
*Director of the United States Patent and Trademark Office*